United States Patent
Horng et al.

(10) Patent No.: US 7,064,940 B2
(45) Date of Patent: Jun. 20, 2006

(54) OVER HEAT PROTECTION CIRCUIT FOR A BRUSHLESS DC MOTOR

(75) Inventors: Alex Horng, Kaohsiung (TW); Ta-Lun Ko, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 348 days.

(21) Appl. No.: 10/442,157

(22) Filed: May 21, 2003

(65) Prior Publication Data

US 2004/0165325 A1 Aug. 26, 2004

(30) Foreign Application Priority Data

Feb. 24, 2003 (TW) ............................. 92202960 U

(51) Int. Cl.
*H02H 5/04* (2006.01)
(52) U.S. Cl. ...................................................... 361/25
(58) Field of Classification Search ................ 361/25
See application file for complete search history.

(56) References Cited

U.S. PATENT DOCUMENTS

| | | | | |
|---|---|---|---|---|
| 4,413,213 A * | 11/1983 | Baumgarten, Jr. | ........... | 388/814 |
| 5,585,990 A * | 12/1996 | Manning et al. | ............... | 361/25 |
| 5,942,866 A * | 8/1999 | Hsieh | ........................ | 318/268 |
| 5,963,442 A * | 10/1999 | Yoshida et al. | ................ | 363/98 |
| 6,005,761 A * | 12/1999 | Izawa et al. | ................. | 361/103 |
| 6,169,648 B1 * | 1/2001 | Denvir et al. | .................. | 361/25 |
| 6,331,763 B1 * | 12/2001 | Thomas et al. | ............. | 320/136 |
| 6,407,525 B1 * | 6/2002 | Horng et al. | ................ | 318/473 |
| 6,710,558 B1 * | 3/2004 | Mack et al. | ................. | 318/254 |
| 6,819,091 B1 * | 11/2004 | Ishihara et al. | ............. | 323/285 |
| 2004/0051622 A1 * | 3/2004 | Banich et al. | ............ | 338/22 R |

* cited by examiner

*Primary Examiner*—Stephen W. Jackson
*Assistant Examiner*—James A. Demakis
(74) *Attorney, Agent, or Firm*—Bacon & Thomas, PLLC

(57) ABSTRACT

A over heat protection circuit for a brushless dc motor includes a thermal sensitive resistor, a resistor and a transistor. The thermal sensitive resistor and the resistor are commonly connected to a base of the transistor while an emitter of the transistor connecting to a motor coil. The thermal sensitive resistor has a resistance value which can be changed in response to an operational temperature. The thermal sensitive resistor is preset to operate at a safety temperature within a predetermined thermal preference. When the operational temperature of the motor coil exceeds the safety temperature, the over heat protection circuit may to cut off a motor current so that the motor coil is protected.

5 Claims, 1 Drawing Sheet

OVER HEAT PROTECTION CIRCUIT FOR A BRUSHLESS DC MOTOR

BACKGROUND OF THE INVENTION

1. Field of the Invention

The present invention is related to an over heat protection circuit for a brushless dc motor. More particularly, the present invention is related to an over heat protection circuit having a thermal sensitive resistor to detect an operational temperature of a motor, thereby cutting off a motor current passing through a coil, when overheated, to protect the motor.

2. Description of the Related Art

A conventional over heat protection circuit is consisted of a complicated circuit and comprised of a thermal sensitive resistor incorporated into the complicated circuit. The thermal sensitive resistor of the over heat protection circuit has a changeable characteristic of resistance that is in response to changing of an operational temperature of a brushless dc motor. To accomplish protection of the motor, the over heat protection circuit must cut off a motor current when overheated, or change a rotational speed of the motor according to the operational temperature. However, the over heat protection circuit includes too many electronic components, such as resistors, a programmable chip, a pulse width modulator, transistors, capacitors, and diodes etc, and it may increase manufacture cost. Moreover, various drive circuits of the brushless dc motor requires different thermal resistance to constitute various driving modules that results in an incompatible problem. Consequently, a single over heat protection circuit cannot be empoyed in various drive circuits of the brushless dc motor.

The present invention intends to provide an over heat protection circuit for a brushless dc motor, which is consisted of a thermal sensitive resistor, a resistor and a transistor to form a simplified circuit for cutting off a motor current, when overheated, that may avoid destruction of the motor. Thereby, the over heat protection circuit accomplishes a simplified circuit, low manufacture cost and various design choice in such a way to mitigate and overcome the above problem.

SUMMARY OF THE INVENTION

The primary objective of this invention is to provide an over heat protection circuit for a brushless dc motor, which is consisted of a thermal sensitive resistor, a resistor and a transistor to form a simplified circuit for cutting off a motor current when overheated. The over heat protection circuit may increase useful life of the motor, simplify the circuitry structure and lower manufacture cost.

The secondary objective of this invention is to provide an over heat protection circuit for a brushless dc motor, which is able to consist of a negative temperature coefficient type or a positive temperature coefficient type of a thermal sensitive resistor according to design choice. Consequently, the over heat protection circuit for the brushless dc motor can be varied in circuit design.

The over heat protection circuit for a brushless dc motor in accordance with the present invention comprises a thermal sensitive resistor, a resistor and a transistor. The thermal sensitive resistor and the resistor are commonly connected to a base of the transistor while the transistor connecting to a motor coil. The thermal sensitive resistor has a resistance value which can be changed in response to an operational temperature. The thermal sensitive resistor is preset to operate at a safety temperature within a predetermined thermal preference. When the operational temperature of the motor coil exceeds the safety temperature, the over heat protection circuit may to cut off a motor current so that the motor coil is protected.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
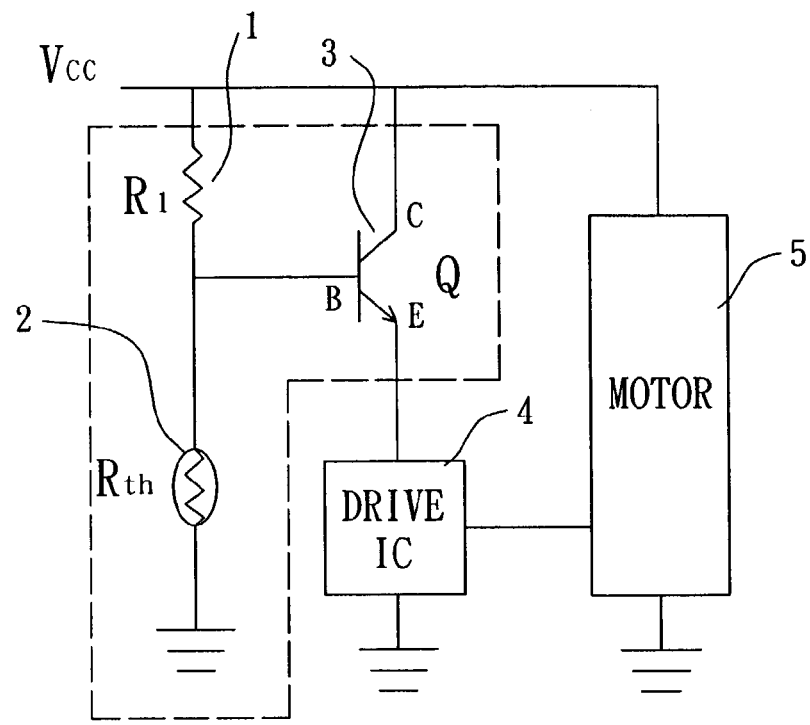
FIG. 1 is a schematic diagram of an over heat protection circuit for a brushless dc motor in accordance with a first embodiment of the present invention.

Referring now to the drawings, there are two embodiments of the present invention shown therein, which include generally a primary motor member and a secondary circuit member.

Figure 2:
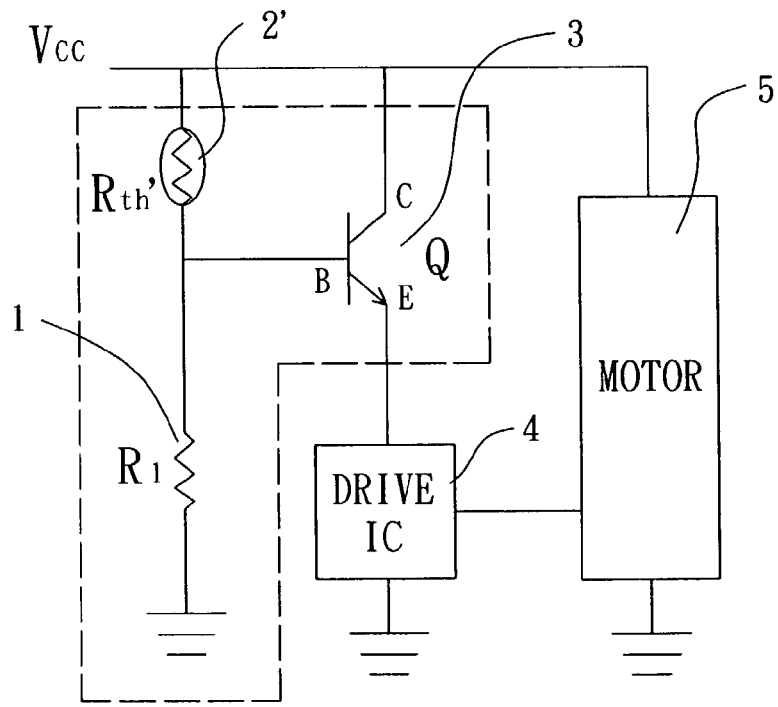
FIG. 2 is a schematic diagram of an over heat protection circuit for a brushless dc motor in accordance with a second embodiment of the present invention.

Referring to FIGS. 1 and 2, an over heat protection circuit for a brushless dc motor 5 in accordance with the present invention includes a resistor 1, a thermal sensitive resistor 2 and a transistor 3. The resistor 1 and the thermal sensitive resistor 2 are commonly connected to a base of the transistor 3 while an emitter of the transistor 3 connecting to a drive IC 4 of a motor coil. The thermal sensitive resistor 2 has a resistance value which can be changed in response to an operational temperature of the motor coil. The thermal sensitive resistor 2 is preset to operate at a safety temperature within a predetermined thermal preference. When the operational temperature of the motor coil exceeds the safety temperature, the over heat protection circuit may cut off a motor current so that the motor coil is protected. Thereby, the motor 5 may be prolonged useful life, simplified circuitry structure and reduced manufacture cost.

Referring again to FIG. 1, it illustrates a schematic diagram of an over heat protection circuit for a brushless dc motor in accordance with a first embodiment of the present invention. The thermal sensitive resistor 2 of the over heat protection circuit is selected from a negative temperature coefficient (NTC) type that performs a resistance value inverse-proportional to temperature.

Construction of the over heat protection circuit shall be described in detail, referring again to FIG. 1. An end of the resistor 1 and a collector of the transistor 3 are commonly connected to a voltage source Vcc, and the other end of the resistor 1 is connected to a first end of the thermal sensitive resistor (NTC) 2 and the base of the transistor 3. Meanwhile, a second end of the thermal sensitive resistor (NTC) 2 connected to the ground. Then, the resistor 1 and the thermal sensitive resistor 2 are serially connected at a connection point at which to commonly provide with an adjustable voltage value which is supplied from the voltage source Vcc. The emitter of the transistor 3 is connected to the motor 5 which is essentially consisted of the motor coil and the drive IC thereof.

Referring again to FIG. 1, the resistor 1 and the thermal sensitive resistor 2 are adapted to provide with an adequate voltage value (equal to and greater than 0.7V) so that the base of the transistor 3 may be turned on to supply power to the drive IC. Then, the drive IC is able to alternatively turn on or off the motor current to pass through the motor 5.

In normal operation, when the operational temperature of the motor 5 is still less than the safety temperature, the resistance value of the thermal sensitive resistor (NTC) 2 is greater than a predetermined reference. Consequently, it is maintained to provide with the adequate voltage (equal to and greater than 0.7V) to turn on the base of the transistor 3 and to thus conduct between the collector and the emitter of the transistor 3 for supplying electric power to the drive IC. At this time, the drive IC is allowed to alternatively turn on or off the motor current of the motor 5 so that it is operated normally.

In abnormal operation, when the operational temperature of the motor 5 is greater than the safety temperature or overheated, the resistance value of the thermal sensitive resistor (NTC) 2 is correspondingly adjusted and less than a predetermined reference. Consequently, it is adjusted to provide with the inadequate voltage (less than 0.7V) to turn off the base of the transistor 3 and to thus cut off between the collector and the emitter of the transistor 3 for terminating electric power to the drive IC. At this time, the drive IC is not actuated and allowed to turn on or off the motor current of the motor 5 so that it is stopped permanently or temporarily according to design choice. Thereby, the motor 5 is able to avoid being destroyed.

When the operational temperature of the motor 5 is re-lowered and less than the safety temperature, the resistance value of the thermal sensitive resistor (NTC) 2 is greater than a predetermined reference again. Consequently, the motor current of the motor 5 is re-started and operated normally.

Referring again to FIG. 2, reference numerals of the second embodiment has applied the identical numerals of the first embodiment. The over heat protection circuit of the second embodiment has the similar configuration and same function as that of the first embodiment and the detailed descriptions are omitted.

Referring again to FIG. 2, it illustrates a schematic diagram of an over heat protection circuit for a brushless dc motor in accordance with a second embodiment of the present invention. In comparison with the first embodiment, the thermal sensitive resistor 2' of the over heat protection circuit of the second embodiment is selected from a positive temperature coefficient (PTC) type that performs a resistance value proportional to temperature.

Construction of the over heat protection circuit shall be described in detail, referring again to FIG. 2. A first end of the thermal sensitive resistor (PTC) 2' and a collector of the transistor 3 are commonly connected to a voltage source Vcc, and a second end of the thermal sensitive resistor (PTC) 2' is connected to an end of the resistor 1 and the base of the transistor 3. Meanwhile, the other end of the resistor 1 connected to the ground. The emitter of the transistor 3 is connected to the motor 5 which is essentially consisted of the motor coil and the drive IC thereof.

In normal operation, when the operational temperature of the motor 5 is still less than the safety temperature, the resistance value of the thermal sensitive resistor (PTC) 2' is less than a predetermined reference. Consequently, it is maintained to provide with the adequate voltage (equal to and greater than 0.7V) to turn on the base of the transistor 3 and to thus conduct between the collector and the emitter of the transistor 3 for supplying electric power to the drive IC. At this time, the drive IC is allowed to alternatively turn on or off the motor current of the motor 5 so that it is operated normally.

In abnormal operation, when the operational temperature of the motor 5 is greater than the safety temperature or overheated, the resistance value of the thermal sensitive resistor (PTC) 2' is correspondingly adjusted and greater than a predetermined reference. Consequently, it is adjusted to provide with the inadequate voltage (less than 0.7V) to turn off the base of the transistor 3 and to thus cut off between the collector and the emitter of the transistor 3 for terminating electric power to the drive IC. At this time, the drive IC is not allowed to turn on or off the motor current of the motor 5 so that it is stopped permanently or temporarily to avoid being destroyed.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An over heat protection circuit for protecting a brushless dc motor, comprising:
    a thermal sensitive resistor having a resistance value adapted to change within a predetermined thermal preference in response to changing of an operational temperature of the motor;
    a resistor serially connected to the thermal sensitive resistor at a connection point at which to commonly provide an adjustable voltage value which is supplied from a voltage source;
    a transistor including a base, a collector and an emitter, wherein the base is connected to the connection point located between the thermal sensitive resistor and the resistor so that the adjustable voltage value is input to the base; the collector is connected to the voltage source; and the emitter is connected to the motor for controlling operation of the motor;
    wherein when the operational temperature of the motor is greater than a safety temperature or the motor is overheated, the resistance value of the thermal sensitive resistor is correspondingly adjusted with respect to a predetermined reference such that the adjustable voltage value of the thermal sensitive resistor and the resistor is inadequate to turn on the base of the transistor so as to cut off a motor current and thereby stop the motor to reduce the operational temperature of the motor; and
    wherein when the operational temperature of the motor is lower than the safety temperature or the motor has cooled, the resistance value of the thermal sensitive resistor is correspondingly adjusted with respect to the predetermined reference such that the adjustable voltage value of the thermal sensitive resistor and the resistor is adequate to turn on the base of the transistor so as to resupply a motor current and thereby restart the motor.

2. The over heat protection circuit for the brushless dc motor as defined in claim 1, wherein the thermal sensitive resistor is a negative temperature coefficient type resistor; a first end of the resistor is connected to the voltage source and a second end of the resistor is connected to a first end of the thermal sensitive resistor; and a second end of the thermal sensitive resistor is connected to ground.

3. The over heat protection circuit for the brushless dc motor as defined in claim 1, wherein the thermal sensitive resistor is a positive temperature coefficient type resistor; a first end of the thermal sensitive resistor is connected to the voltage source and a second end of the thermal sensitive resistor is connected to a first end of the resistor; and a second end of the resistor is connected to ground.

4. The over heat protection circuit for the brushless dc motor as defined in claim 1, wherein the motor includes a motor coil through which the motor current is passed; the motor coil having a first end connected to the voltage source, and a second end connected to the over heat protection circuit.

5. The over heat protection circuit for the brushless dc motor as defined in claim 1, wherein the motor includes a drive IC connected to the transistor of the over heat protection circuit.

* * * * *